July 7, 1931.  H. H. FRANKS  1,813,045
ENGINE FRAME
Filed Jan. 20, 1930  3 Sheets-Sheet 1

Fig. 1.

INVENTOR
Harry H. Franks
BY Arthur E. Brown
ATTORNEY

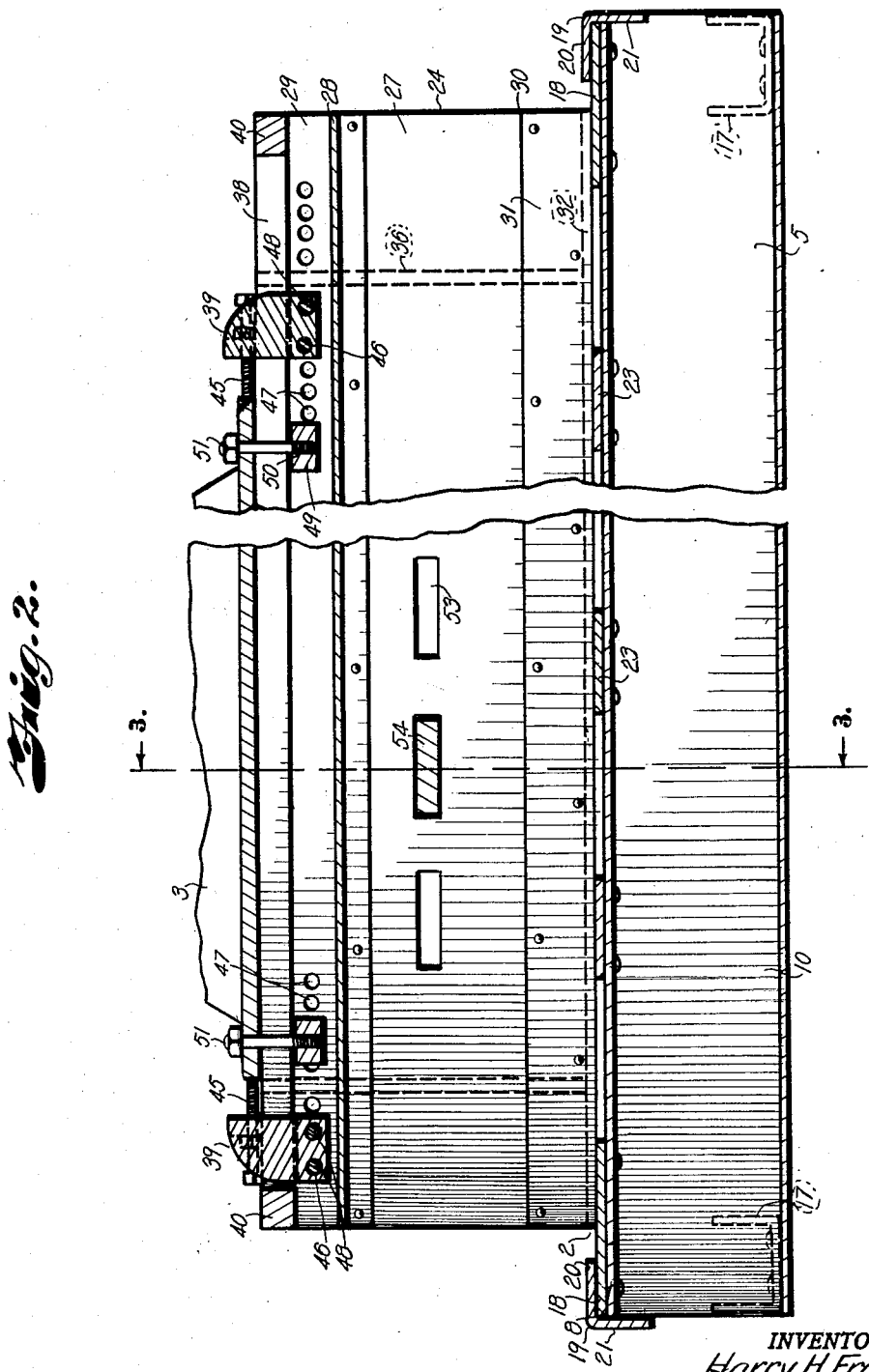

July 7, 1931.  H. H. FRANKS  1,813,045
ENGINE FRAME
Filed Jan. 20, 1930   3 Sheets-Sheet 3
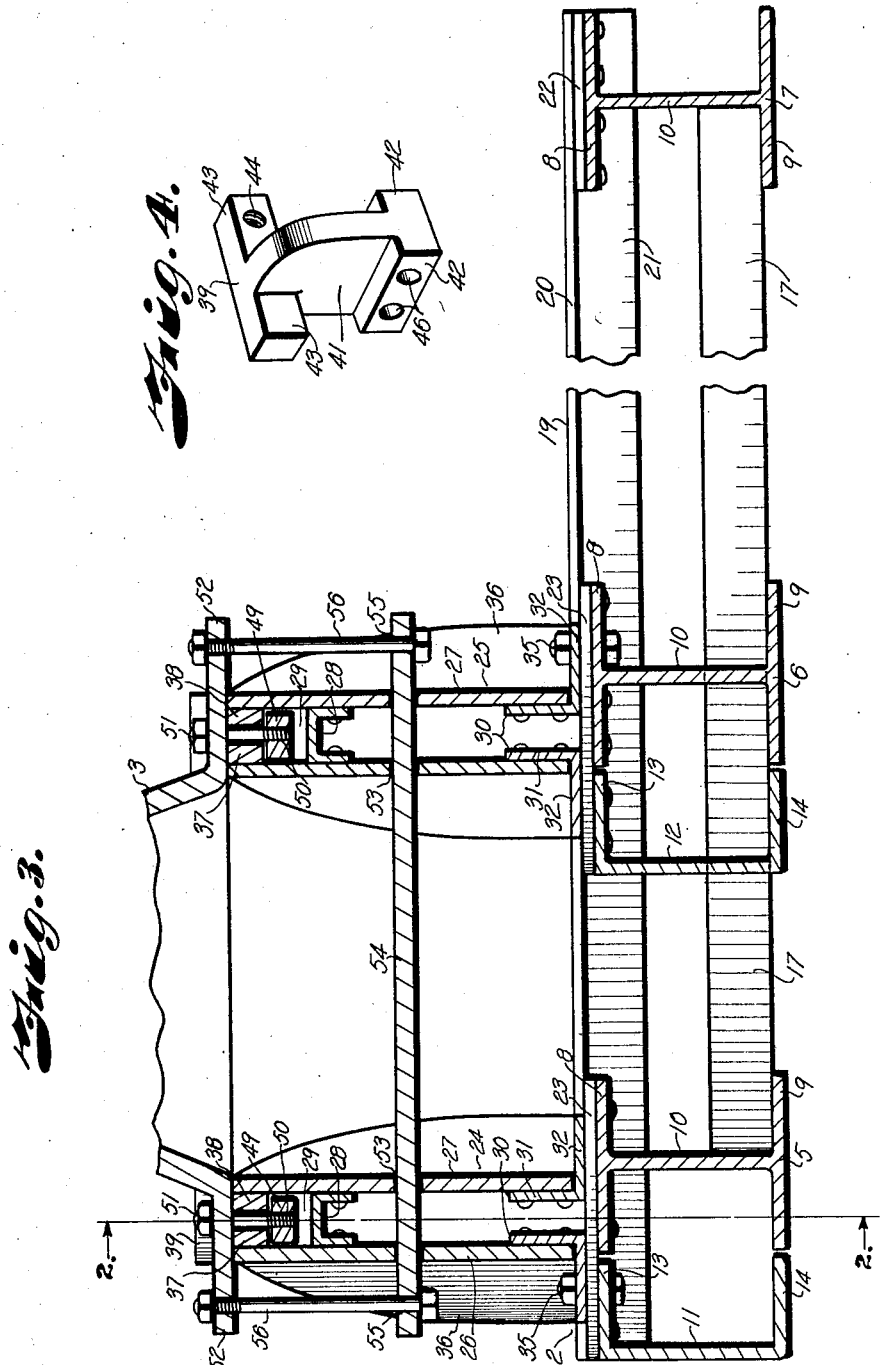
INVENTOR
Harry H. Franks
BY
ATTORNEY Patented July 7, 1931

1,813,045

UNITED STATES PATENT OFFICE

HARRY H. FRANKS, OF TULSA, OKLAHOMA, ASSIGNOR OF THREE-FOURTHS TO TIDAL OIL COMPANY, OF TULSA, OKLAHOMA, A CORPORATION OF OKLAHOMA

ENGINE FRAME

Application filed January 20, 1930. Serial No. 422,009.

My invention relates to supporting frames for engines and the like and has for its principal object to provide a stock frame which may be readily adjusted to fit various sizes and types of engine bases.

In accomplishing this and other objects of the invention, I have provided improved details of structure, the preferred form of which is illustrated in the accompanying drawings, wherein:

Fig. 1 is a perspective view of a supporting frame constructed in accordance with my invention and illustrating an engine mounted thereon.

Fig. 2 is a longitudinal section through the frame and a portion of the engine base.

Fig. 3 is a cross sectional view on the line 3—3, Fig. 2.

Fig. 4 is a detail perspective view of one of the abutment members for supporting a jack screw.

Referring more in detail to the drawings:

1 designates a concrete foundation for an engine supporting frame 2 embodying my invention, and supported on the frame is an engine or compressor 3 of any suitable type but is here illustrated as an ordinary gas engine adapted for driving a belt 4.

The frame 2 includes a sub-frame comprising spaced, longitudinal structural members 5, 6 and 7 preferably formed of I-beams having upper and lower flanges 8 and 9 connected by a vertical web 10. Extending in juxtaposed relation with the I-beams 5 and 6 are channel members 11 and 12 having upper and lower flanges 13 and 14 in the plane of the I-beam flanges 8 and 9. The lower flanges 9 and 14 of the respective members are provided with elongated openings 15 for receiving bolts 16, anchoring the longitudinal members to the foundation, as shown in Fig. 1. The I-beam members are spaced by channels 17 having their ends resting on the lower flanges of the I-beams and abutting against the webs 10, the inner channel 12 stopping short of the I-beam 6 to accommodate the cross channels. Extending across and connecting the ends of each I-beam with its adjacent channel are plates 18 preferably welded to the horizontal flanges of the respective members.

The longitudinal members are also interconnected at each of their ends by angle members 19, each having one flange 20 resting on the plates 18 and the other flange 21 bearing against the ends of the longitudinal members, as shown in Figs. 1 and 2, the filler plates 22, having the same thickness as the plates 18, being inserted on the I-beam 7 so that the angles 19 are level throughout their length. The structural members composing the sub-frame, as thus far described, are all preferably welded together to provide a rigid structure. However, the members may be riveted or bolted together in any manner common to the art.

Supported on the plates and on intermediate plates 23 fixed at intervals to the flanges of each I-beam and its channel are engine mounting beams 24 and 25, each preferably fabricated of steel plates and including vertical plates 26 and 27 spaced apart by a longitudinally extending channel 28 inserted between the plates and welded to their inner faces at a point spaced from their upper edges about one-fourth the width of the plates to provide a longitudinal groove or recess 29 in the top face of the beams for a purpose later described.

Secured to the lower edge of each plate are angle members 30 having their vertical flanges 31 welded to the inner faces of the plates and horizontal flanges 32 projecting laterally from the plates to provide a footing for mounting beams and for adjustably securing the beams to the plates 18 and 23 as now described.

In order to mount the beams for both longitudinal and lateral movement on the plates to accommodate various width engine bases, the flanges 32 are provided with elongated openings 33 extending longitudinally thereof and the plates 18 and 23 are provided with openings 34 extending crosswise of the flange openings as shown in Fig. 1. Bolts or like fastening devices 35 are extended through the openings to clamp the beams to the plates. The plates are also braced laterally by webs 36 welded within the angle formed by the plate and the horizontal flange of the angles 31 at points adjacent the ends of the beams.

Welded to the inner top edges of the beams and extending longitudinally thereof are bars 37 and 38, providing keeper rails for retaining abutment members 39 slidably in the grooves or recesses 29. The ends of the rails are connected by blocks 40 to close the ends of the grooves and prevent displacement of the abutment members now described.

The abutment members are best illustrated in Fig. 4 and comprise flat body portions 41 slidable between the rails and having rectangular ribs 42 extending laterally from their opposite sides to engage under the lower faces of the rails. The body portions of the abutment members project through the grooves above the rails and extending laterally from their opposite sides are ears 43 engaging both the upper faces of the rails and the upper edges of the plates. One of the ears is provided with a threaded opening 44 receiving a jack screw 45 for engaging the engine base as later described. The abutment members are also provided with openings 46 adapted to align with a series of openings 47 in the mounting beams so that bolts 48 can be projected through the plates and abutment members for securing them in functional position on the beams.

Also mounted in the recesses of the beams and engaging the under sides of the rails are blocks 49 having threaded openings 50 receiving bolts 51 for retaining the engine on the beams as hereinafter described.

In some engines having projecting portions or anchoring lugs such as 52, it is necessary to provide means for anchoring such portions laterally of the beams, and to accomplish this the plates of both beams are provided with a series of aligning rectangular slots 53 for receiving a bar 54 of sufficient length to project the required distance from the beams to align with the lugs 52, and the ends of the bar are provided with openings 55 to receive anchoring bolts 56 for securing the projecting portions of the engine frame.

In using an engine supporting frame constructed as described, the sub-frame consisting of the longitudinal beams, is placed on the foundation 1 and the bolts 16 are inserted through the slots 15 to anchor the sub-frame to the foundation. The engine mounting beams 24 and 25 are then placed on the plates 18 and 23 and adjusted longitudinally to the approximate position for locating the engine. the beams may then be shifted laterally and spaced the proper distance to align the openings in the engine base with the center of the grooves 29 in the beams.

The engine is then placed on the mounting beams and the bolts 51 are inserted through the openings in the engine base and threaded into the blocks 49 which have been shifted in the grooves to align with the openings in the base. The abutment members are then positioned in the grooves adjacent the ends of the engine base and the bolts 48 are inserted through the openings 47 in the plates and through the openings 46 in the abutment members to retain the abutment members in fixed position in the slots.

The jack screws 45 are then adjusted in the ears 43 to bear against the opposite ends of the engine base as shown in Fig. 1. The belt 4 can then be placed over the pulleys and the engine adjusted longitudinally of the beams by operating the jack screws to properly tension the belt, after which the bolts 51 may be tightened to securely anchor the engine to the mounting beams.

In an engine provided with the laterally extending portions, the bar 54 is extended through one pair of aligning slots 53 and the bolts 56 are inserted through the openings in the ends of the bar and the projecting portion as shown in Fig. 1.

Attention is directed to the fact that in small engines the longitudinal beam 7 may be dispensed with, as this beam is provided merely for the purpose of extending the lateral bearing of the frame on the foundation when supporting large types of engines or compressors.

What I claim and desire to secure by Letters Patent is:

1. In an engine supporting frame, a sub-frame, engine mounting members adjustably supported on the sub-frame and having aligning slots, a bar extending through the slots, and means for connecting the bar to an engine base.

2. In an engine supporting frame, engine mounting members comprising spaced plates having a plurality of bolt receiving openings, rails secured to the plates, abutment members retained by the rails and having openings adapted for alignment with the openings in the plates, fastening devices extended through aligning openings in the plates and in the abutment members, and jack screws on the abutment members for adjustably positioning an engine base.

3. In an engine supporting frame, spaced longitudinal members, plates connecting the longitudinal members and having slotted openings therein, engine mounting members supported on the plates and having openings extending across the first named openings, and fastening devices extending through said openings to secure the engine mounting members to the plates.

4. In an engine supporting frame, engine mounting members comprising spaced plates having a plurality of bolt-receiving openings, rails secured to the plates, abutment members including flat body portions snugly mounted between the rails and having openings adapted for alignment with the openings in the plates, fastening devices extended through aligning openings in the plates and in said body portions, laterally extending upper ears on said body portions for engaging the upper edges of the rails and plates, and jack screws threadedly mounted in said ears for adjustably positioning an engine base.

5. In an engine frame, engine mounting members comprising spaced plates having a plurality of bolt-receiving openings, rails secured to the plates, abutment members including flat body portions mounted between the rails, lower ribs on said body portions for engaging the lower edges of said rails and having transverse openings adapted for alignment with the openings in the plates, fastening devices extended through aligning openings in the plates, and in said ribs, laterally extending upper ears on said body portions for engaging the upper edges of the rails, and jack screws threadedly mounted in said ears for adjustably positioning an engine base.

In testimony whereof I affix my signature.

HARRY H. FRANKS.